(12) United States Patent
Jeong

(10) Patent No.: US 7,940,725 B2
(45) Date of Patent: May 10, 2011

(54) MOBILE STATION AND METHOD OF PERFORMING HANDOVER BASED ON INFORMATION OF MOVEMENT BETWEEN CELLS

(75) Inventor: Seok Jong Jeong, Anyang-si (KR)

(73) Assignee: LG-Nortel Co., Ltd., Seoul (KR)

( * ) Notice: Subject to any disclaimer, the term of this patent is extended or adjusted under 35 U.S.C. 154(b) by 837 days.

(21) Appl. No.: 11/907,484

(22) Filed: Oct. 12, 2007

(65) Prior Publication Data

US 2008/0096568 A1    Apr. 24, 2008

(30) Foreign Application Priority Data

Oct. 20, 2006    (KR) .................. 10-2006-0102178

(51) Int. Cl.
*H04W 4/00*    (2009.01)
(52) U.S. Cl. ....................................... 370/331
(58) Field of Classification Search .............. None
See application file for complete search history.

(56) References Cited

U.S. PATENT DOCUMENTS

| | | | | |
|---|---|---|---|---|
| 2002/0142788 A1* | 10/2002 | Chawla et al. | ............ | 455/504 |
| 2003/0069037 A1 | 4/2003 | Kiyomoto et al. | | |
| 2005/0113093 A1* | 5/2005 | Mohebbi | ............ | 455/436 |
| 2006/0002346 A1* | 1/2006 | Sutivong et al. | ............ | 370/332 |
| 2006/0092883 A1* | 5/2006 | Lee et al. | ............ | 370/332 |
| 2006/0223535 A1* | 10/2006 | Das et al. | ............ | 455/436 |
| 2007/0149201 A1* | 6/2007 | Dominique et al. | ............ | 455/442 |

FOREIGN PATENT DOCUMENTS

| | | |
|---|---|---|
| EP | 0 966 173 | 12/1999 |
| KR | 10-2001-0017860 | 3/2001 |
| WO | WO 91/19403 | 12/1991 |
| WO | WO 99/34633 | 7/1999 |
| WO | WO 02/30135 | 4/2002 |

OTHER PUBLICATIONS

Korean Office Action dated Sep. 27, 2007 and partial English-language translation.

* cited by examiner

*Primary Examiner* — Jayanti K Patel
*Assistant Examiner* — Hooman Houshmand
(74) *Attorney, Agent, or Firm* — KED & Associates, LLP

(57) ABSTRACT

A mobile station and a method are provided for determining to perform a handover based on information of movement between cells. In order to perform handovers, a movement discriminator may be formed based on a measured power of transmitted signals. A determination may be made whether to perform the handover based on a plurality of movement discriminators.

19 Claims, 13 Drawing Sheets

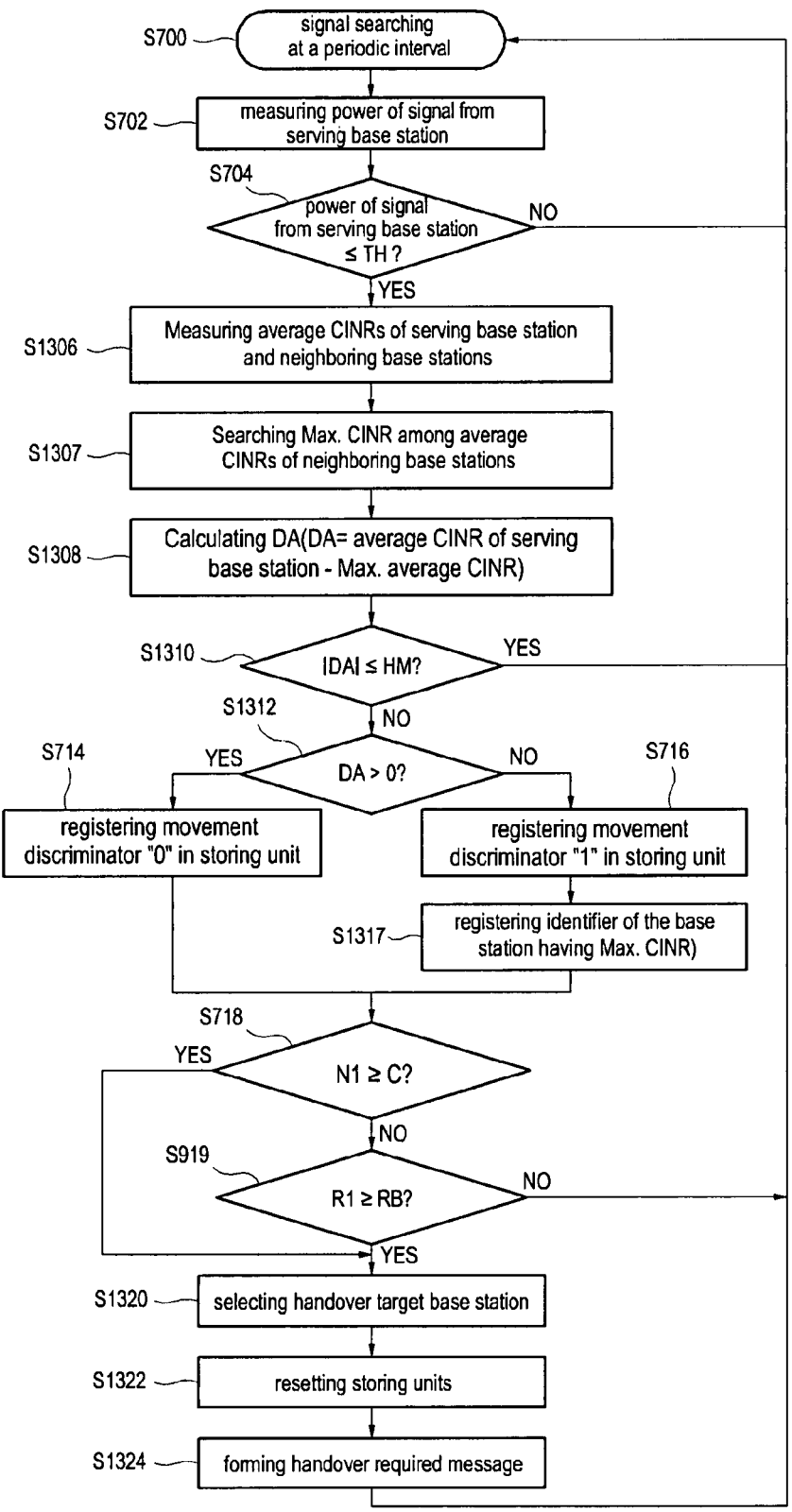

MOBILE STATION AND METHOD OF PERFORMING HANDOVER BASED ON INFORMATION OF MOVEMENT BETWEEN CELLS

BACKGROUND

1. Field

The present application claims priority from Korean Patent Application No. 10-2006-102178, filed Oct. 20, 2006, the entire subject matter of which is incorporated herein by reference.

2. Background

Through mobile communication systems, the entire world may be connected at anytime with the use of a mobile terminal (i.e., a mobile station). In order to provide better communication services to more users by overcoming limitations of a frequency space, all areas covered by a central switching center may be divided into small serving areas called cells. A wireless base station, which is controlled by the central switching center, may be set up in each cell.

Handover allows the mobile station to continuously receive a currently used service when the mobile station moves between mobile communication networks. By performing the handover, communication channels between the mobile station and a base station, which provides a currently used service, can be changed automatically. In order to perform the handover, information on an identifier of a neighboring base station in a cell to which the mobile station will move may be necessary. The information may be included in a "handover require message." The handover may begin when the mobile station sends the handover required message to the serving base station.

The mobile station may measure the power of the signals transmitted from the serving base station at a periodic interval and compare the measured power with a critical power. If the measured power is lower than the critical power, then average carrier-to-interference and noise ratios (CINRs) of the neighboring base stations and the serving base stations for a predetermined interval may be compared to each other. When the average CINR of the neighboring base station is higher than the CINR of the serving base station by a predetermined degree (i.e., by a hysteresis margin), the mobile station may decide to perform the handover to the neighboring base station, the average CINR of which is relatively high.

FIGS. 1 to 3 are graphs showing variation of CINRs versus time. As shown in FIG. 1, as a mobile station moves from a first cell of a serving base station to a second cell of a neighboring base station, an average CINR 11 of the serving base station may decrease while an average CINR 12 of the neighboring base station may increase. As for a predetermined interval t11, if the average CINR 12 is higher than the average CINR 11 by a hysteresis margin HM, then handover may be performed from the serving base station to the neighboring base station. When the mobile station moves from the first cell to the second cell only after repeatedly going in and out of the border of the first and second cells without moving directly from the first cell to the second cell as shown in FIG. 2, a plurality of handovers may be performed whenever an average CINR 22 of the neighboring base station is higher than an average CINR 21 of the serving base station by the hysteresis margin HM for predetermined intervals t21, t22 and t23. Even when the mobile station drops in the second cell for a moment and returns to the first cell as shown in FIG. 3, handovers may be performed only if an average CINR 32 of the neighboring station becomes higher than an average CINR 31 of the serving base station by the hysteresis margin HM for predetermined intervals t31 and t32.

Handovers may be preformed without considering frequent movements of mobile stations between a cell pair. Therefore, unnecessary handovers may be excessively performed. This may cause a ping-pong phenomenon of the handover, communication disconnection and increase of exchanging signal complexity and network load.

BRIEF DESCRIPTION OF THE DRAWINGS

Embodiments may be described in detail with reference to the following drawings in which like reference numerals refer to like elements and wherein:

FIGS. 13 to 15 are flowcharts of handover methods according to example embodiments of the present invention.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled person having the benefit of this disclosure.

Embodiments of the present invention may include a mobile station and/or methods of performing handover when the mobile station moves between one cell of the serving base station and another cell of a neighboring base station.

Figure 1:
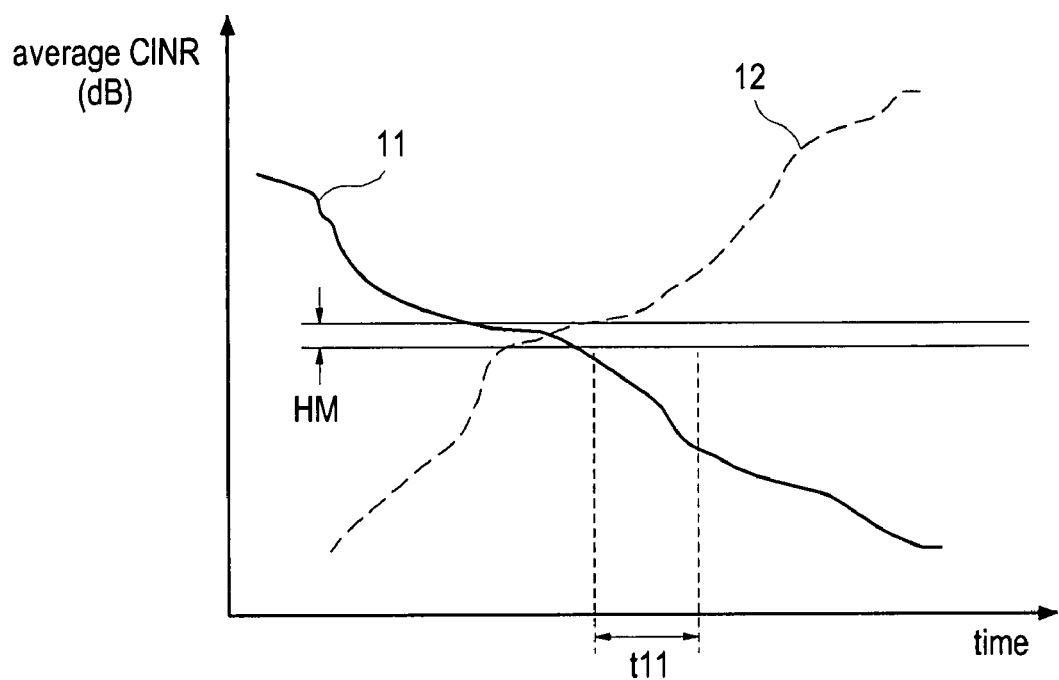
FIGS. 1 to 3 are graphs showing variation of CINR versus time.
Figure 2:
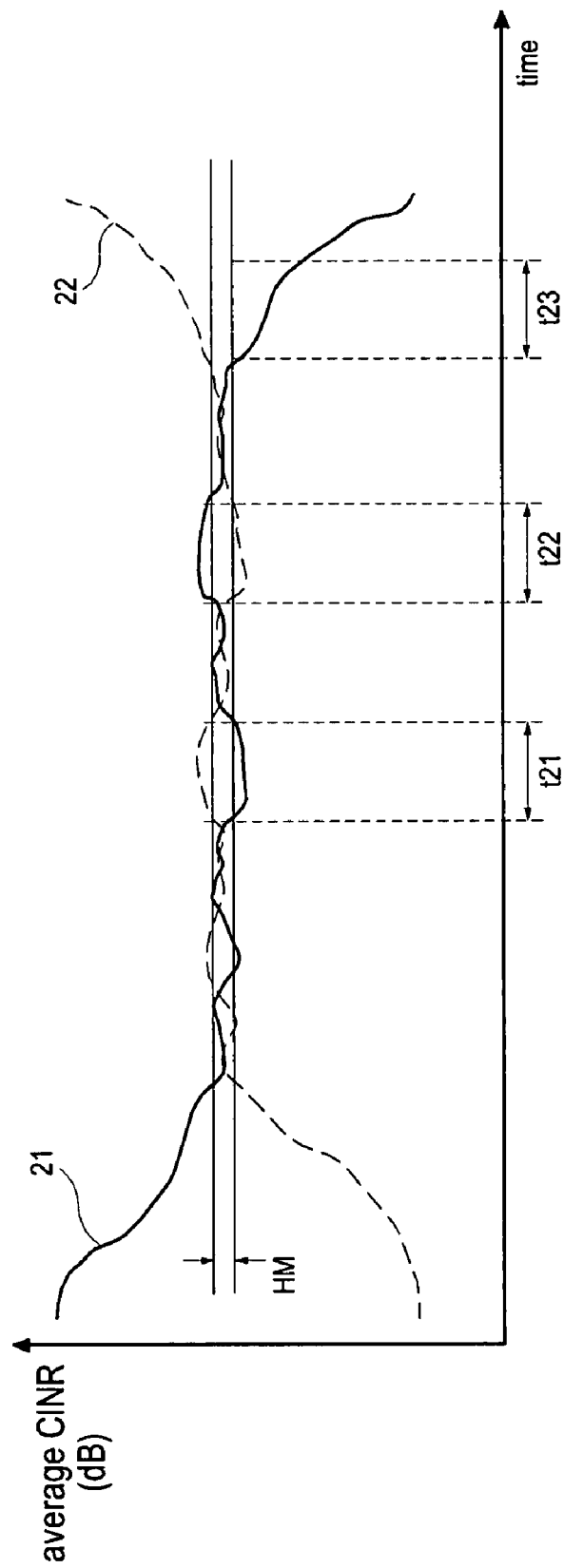
Figure 3:
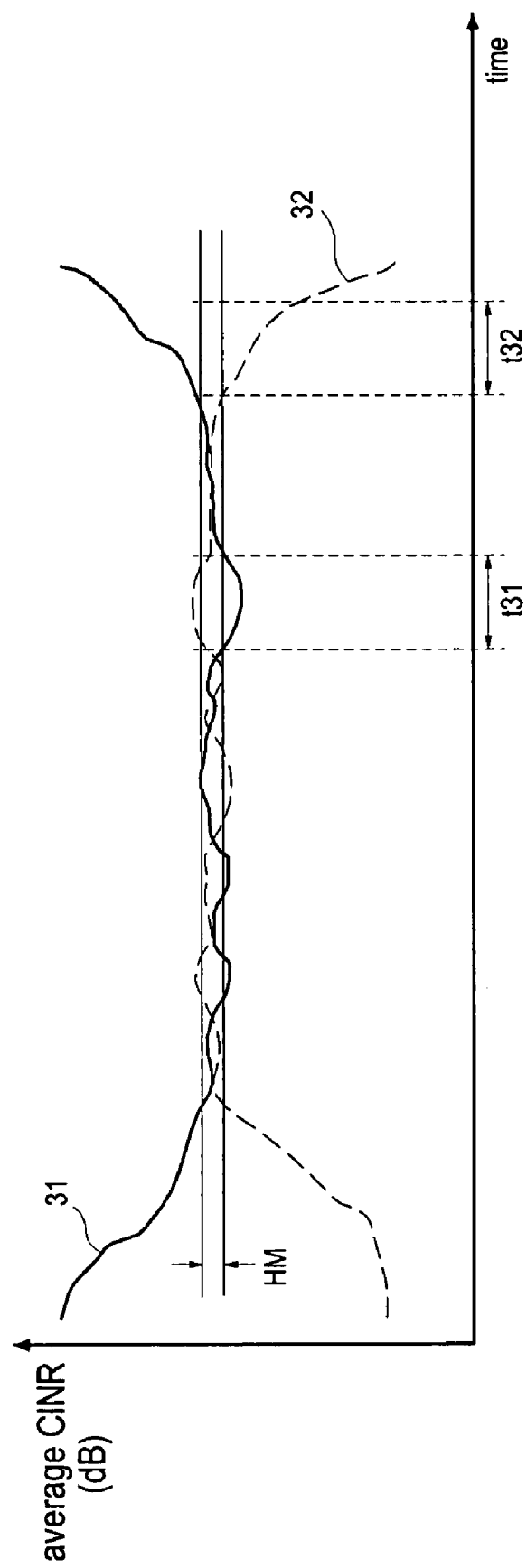
Figure 4:
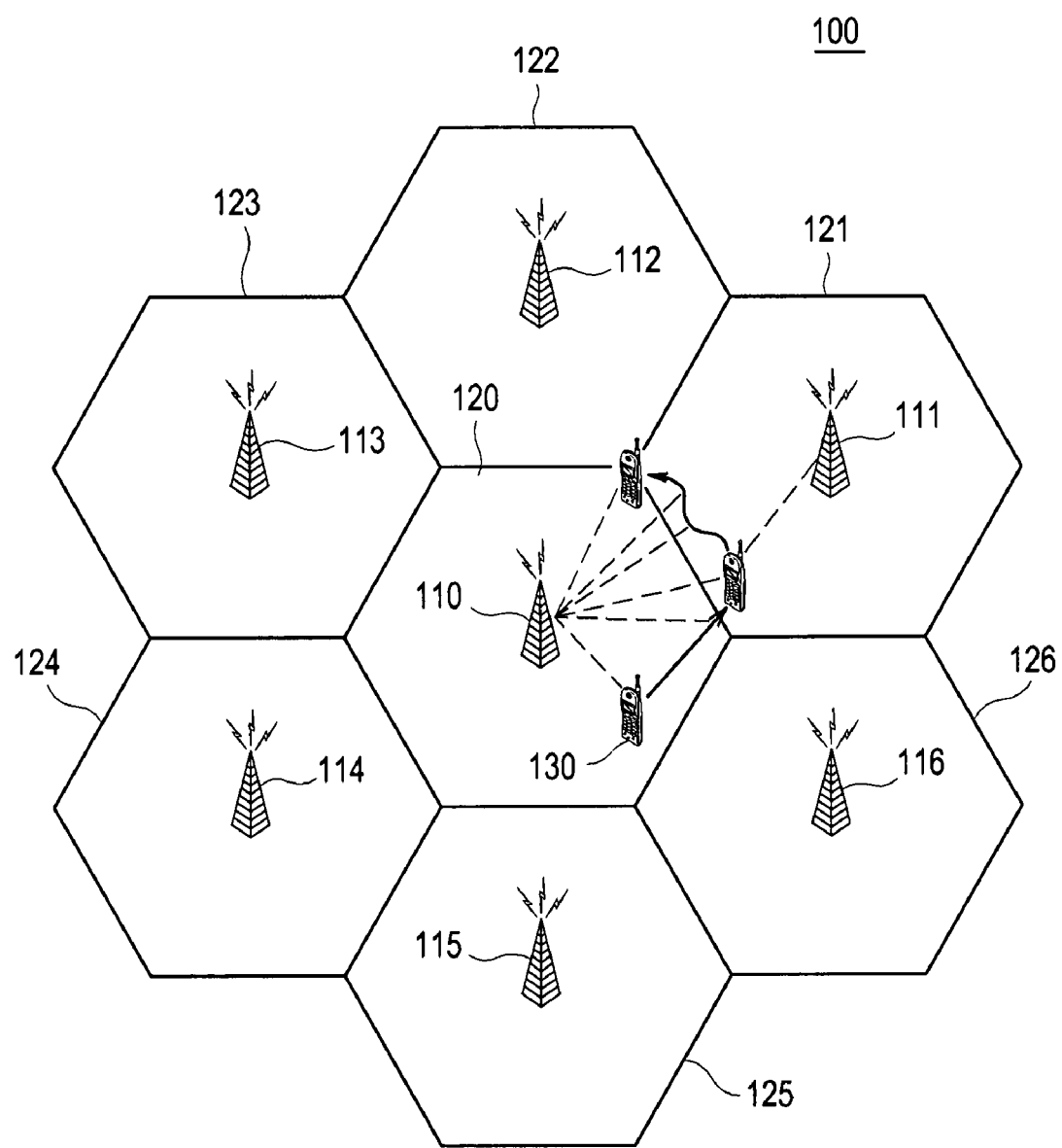
FIG. 4 is a schematic diagram of a mobile communication environment.

FIG. 4 is a schematic diagram of a mobile communication environment. In the mobile communication environment 100, a service area may be divided into a plurality of cells 120 to 126. Independent base stations 110 to 116 may cover the cells 120 to 126, respectively. A mobile station 130 may communicate with a serving base station 110 covering the cell 120 when the mobile station 130 moves between the cells 120 and 121. During the communication, the mobile station 130 may scan signals transmitted from the serving base station 110 and the neighboring base station 111 and may measure the power of the respective signals. The mobile station 130 then decides whether or not to perform the handover. When the mobile station 130 decides to perform the handover, the mobile station 130 may form and send a handover required message (including an identifier of the neighboring base station 111 in the cell 121 to which the mobile station will move) to the serving base station 110 as a start of the handover.

Figure 5:
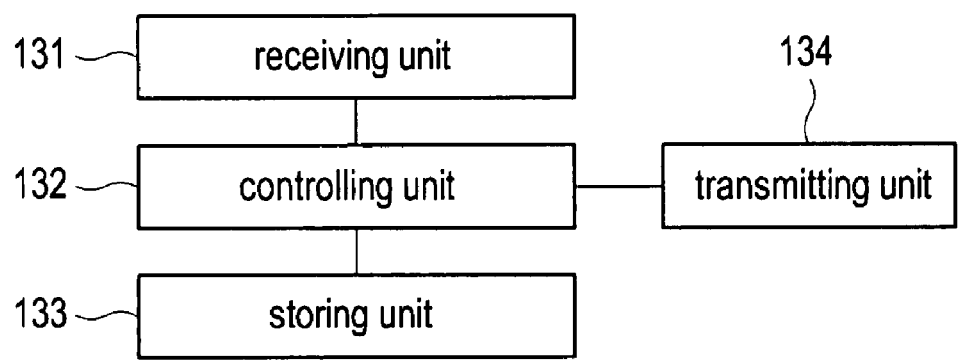
FIG. 5 shows a mobile station according to an example embodiment of the present invention.

FIG. 5 shows a mobile station according to an example embodiment of the present invention. Other embodiments and configurations are also within the scope of the present invention. More specifically, FIG. 5 shows a mobile station 130 that includes a receiving unit 131, a controlling unit 132, a storing unit 133 and a transmitting unit 134. The receiving unit 131 may receive signals transmitted from the serving base station 110 and the neighboring base station 111. The transmitted signals may be pilot signals relating to downlink channels. The identifiers of the respective base stations 110 and 111 may be contained in the transmitted signals. The controlling unit 132 may form movement discriminators of the mobile station 130 between the cells 120 and 121 based on power of the transmitted signals. The controlling unit 132 may also register the movement discriminators in the storing unit 133 one after another and form a handover required message based on the movement discriminators accumulatively stored in the storing unit 133. The transmitting unit 134 may transmit the handover required message.

The mobile station 130 may be a cellular phone, a personal digital assistance (PDA), a beeper or other type of mobile communication device. The mobile station 130 may include elements other than those shown in FIG. 5. For example, if the mobile station 130 is a cellular phone, then the mobile station 130 may further include a microphone, a speaker, a liquid crystal unit (LCD) for display, etc.

The movement discriminator may include binary information denoting where the mobile station 130 lies (i.e., a location of the mobile station 130). For example, the movement discriminator may be a "0" when the mobile station 130 lies in the cell 120 of the serving base station 110 and may be a "1" when the mobile station 130 lies in the cell 121 of the neighboring base station 111.

Figure 6:
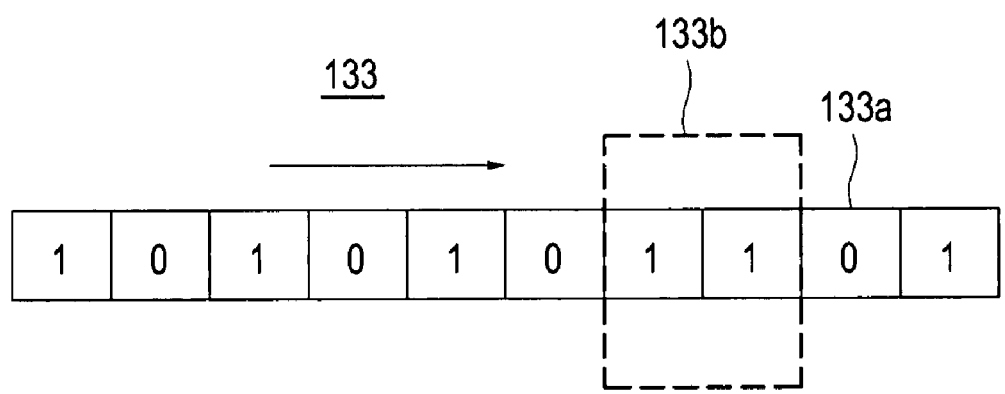
FIG. 6 illustrates registering movement discriminators of the mobile station between cells in a storing unit according to an example embodiment of the present invention.

FIG. 6 illustrates registering movement discriminators of the mobile station between cells in a storing unit according to an example embodiment of the present invention. Other embodiments and configurations are also within the scope of the present invention. More specifically, FIG. 6 shows that the storing unit 133 may include a plurality of storing regions 133a. The storing unit 133 may be configured with a buffer memory or a register. In the storing regions 133a, the movement discriminator ("0" or "1") may be registered one after another in an output order from the controlling unit 132. In FIG. 6, an arrow denotes a consecutive registering order of the movement discriminators. If all the storing regions 133a are filled with the movement discriminators, then the movement discriminator stored first may be replaced with the movement discriminator inputted last one after another.

Figure 7:
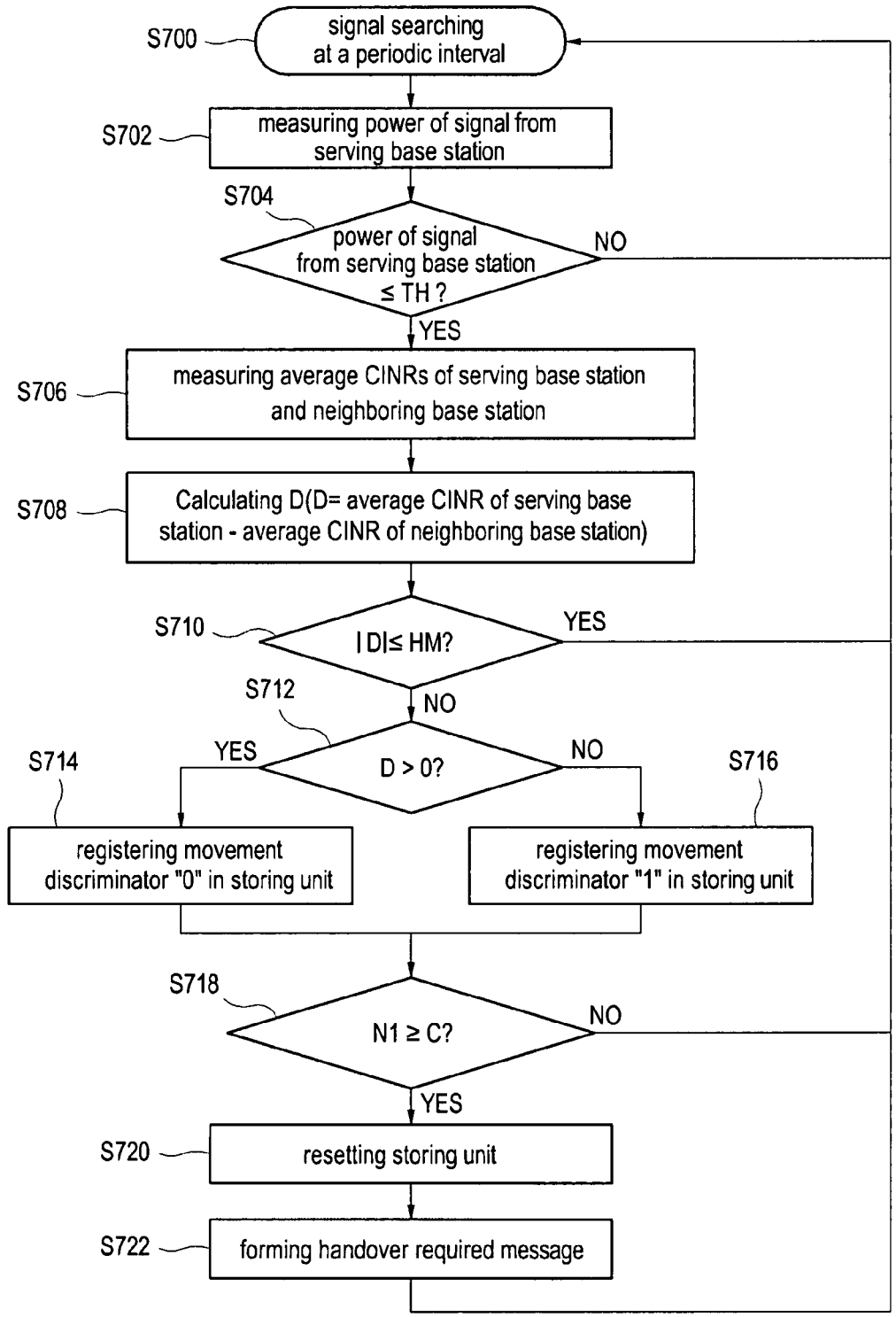
FIGS. 7 to 9 are flowcharts of handover methods according to example embodiments of the present invention.

FIG. 7 is a flowchart showing a handover method according to an example embodiment of the present invention. Other embodiments, operations and orders of operation are also within the scope of the present invention. As shown in FIG. 7, the controlling unit 132 of the mobile station 130 may scan or search transmitted signals from the serving base station 110 at a periodic interval (S700). The controlling unit 132 may scan the transmitted signals every 125 ms, for example. The controlling unit 132 may measure the power of the transmitted signals from the serving base station (S702).

The controlling unit 132 may determine whether the measured power is greater than a critical power TH (S704). The critical power TH, which is adopted to determine whether or not to perform the handover, may be based on consideration of design conditions of the communication environment 100 and the mobile station 130 (e.g., structure, types, environment, etc.). If the measured power is greater than the critical power TH, then the controlling unit 132 may again perform S700 to S702 because handover is not required.

If the measured power is less than the critical power TH, then the average Carrier to Interference and noise Ratios (CINRs) of the serving and the neighboring stations may be measured over a predetermined time, e.g., 100 ms (S706). The average CINR of the neighboring station may be subtracted from the CINR of the serving base station to obtain a difference D (S708). In S710, an absolute value of the difference D may be compared with a hysteresis margin HM (S710). The hysteresis margin HM may be based on design conditions of the communication environment 100 and the mobile station 130. If the absolute value of the difference D is less than or equal to the hysteresis margin HM, then the controlling unit 132 may return to S700 since handover is not required.

If the absolute value of the difference D is not less than or equal to the hysteresis margin HM, then a determination may be made whether the difference D is a positive number (S712). If the difference D is a positive number, then the mobile station 130 may stay within the cell 120 of the serving base station 110. In such a case, the controlling unit 132 may form the first movement discriminator "0" and registers the first movement discriminator "0" in a vacant storing region 133a of the storing unit 133 in order (S714). If the difference D is not a positive number, then the mobile station 130 may stay within the cell 121 of the neighboring base station 111. In such a case, the controlling unit 132 forms the second movement discriminator "1" and registers the second movement discriminator "1" in a vacant storing region 133a of the storing unit 133 in order (S716).

After S714 or S716, the controlling unit 132 determines whether or not to perform handover based on the discriminators accumulatively registered in the storing unit 133. A determination may be made whether a number N1 of the second movement discriminator '1' consecutively registered in the storing unit 133 is greater than a reference number C (S718). The reference number C, which corresponds to a reference time, may be based on design conditions of the communication environment 100 and the mobile station 130. If the number N1 is greater than the reference number C, then the mobile station 130 has stayed in the cell 121 of the neighboring station 111 for more than the reference time. In such a case, the controlling unit 132 may recognize that the conditions required to perform the handover are satisfied. In other words, the controlling unit 132 may recognize that the mobile station 130 is in an active state to perform the handover. In the active state, the controlling unit 132 may reset the storing unit 133 to remove movement discriminators registered in all the storing regions 133a (S720) and form a handover required message including an identifier of the neighboring base station 111 (S722). The handover required message may be sent to the serving base station 110 through the transmitting unit 134 to perform the handover. If the number N1 is below the reference number C, then conditions required to perform the handover are not satisfied. That is, the mobile station 130 may be considered to be in a holding state. In such a case, the controlling unit 132 returns to S700 since handover is not required.

Figure 8:
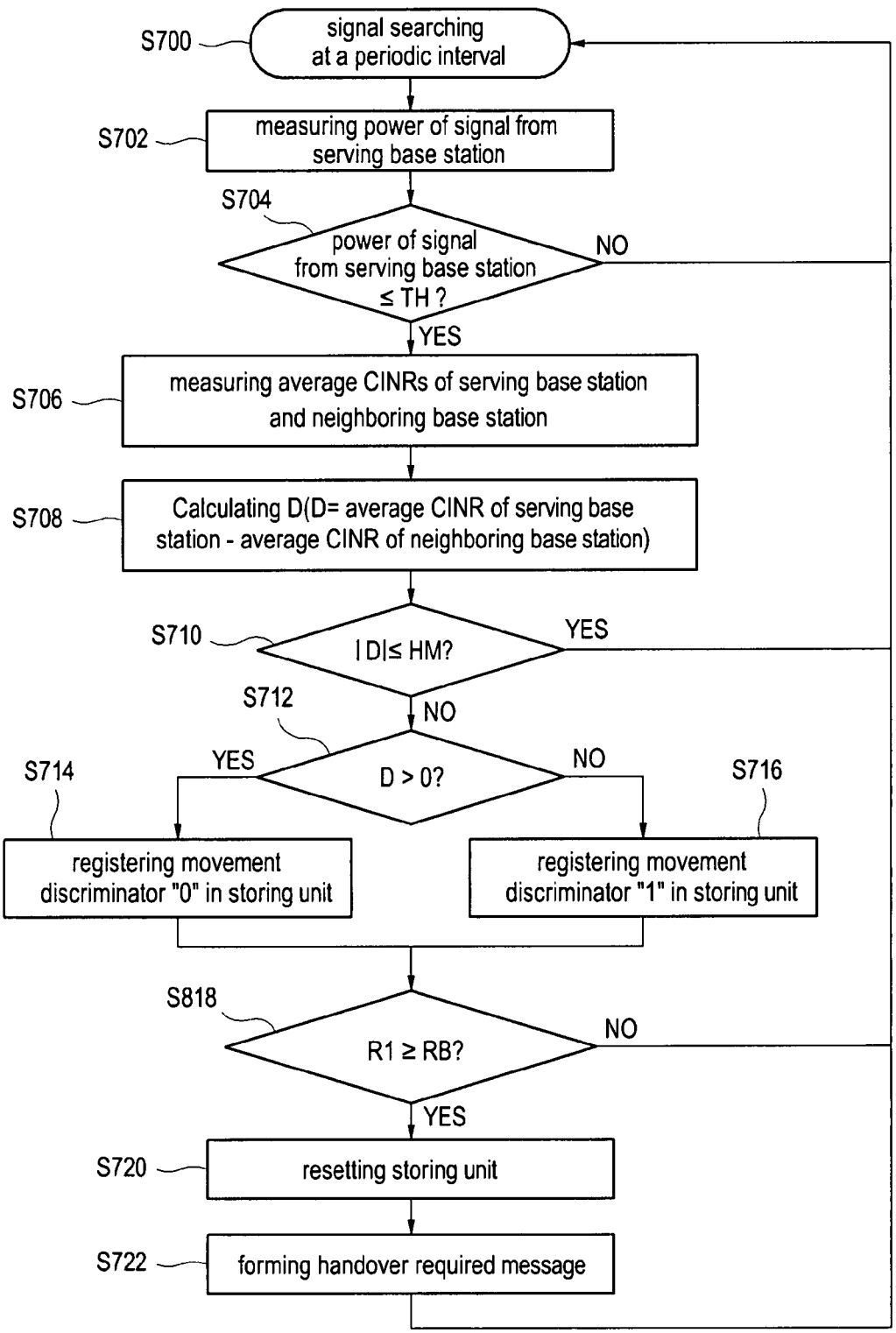

FIG. 8 is a flowchart showing a handover method according to an example embodiment of the present invention. Other embodiments, operations and orders of operations are also within the scope of the present invention. Referring to FIG. 8, after S714 or S716, the controlling unit 132 may decide whether or not to perform handover by determining whether a rate R1 is greater than a predetermined rate RB (S818). The rate R1 may be defined based on a number of the second discriminators "1" over a total number of the discriminators "0" and "1" registered in the storing unit 133. The predetermined rate RB may also be set up based on design conditions of the mobile communication environment 100 and the mobile station 130. The predetermined rate may be set to 60%, for example. If the rate R1 is greater than the predetermined rate RB, then the total registered number of the discriminators "0" and "1" may be ten and the registered number of discriminator "1" may be six. In FIG. 6, the controlling unit 132 may decide to perform the handover (i.e., the controlling unit 132 may perform S720 and S722). If the rate R1 is below the predetermined rate RB, then the mobile station 130 may be in the holding state. In such a case, the controlling unit 132 may return to S700.

Figure 9:
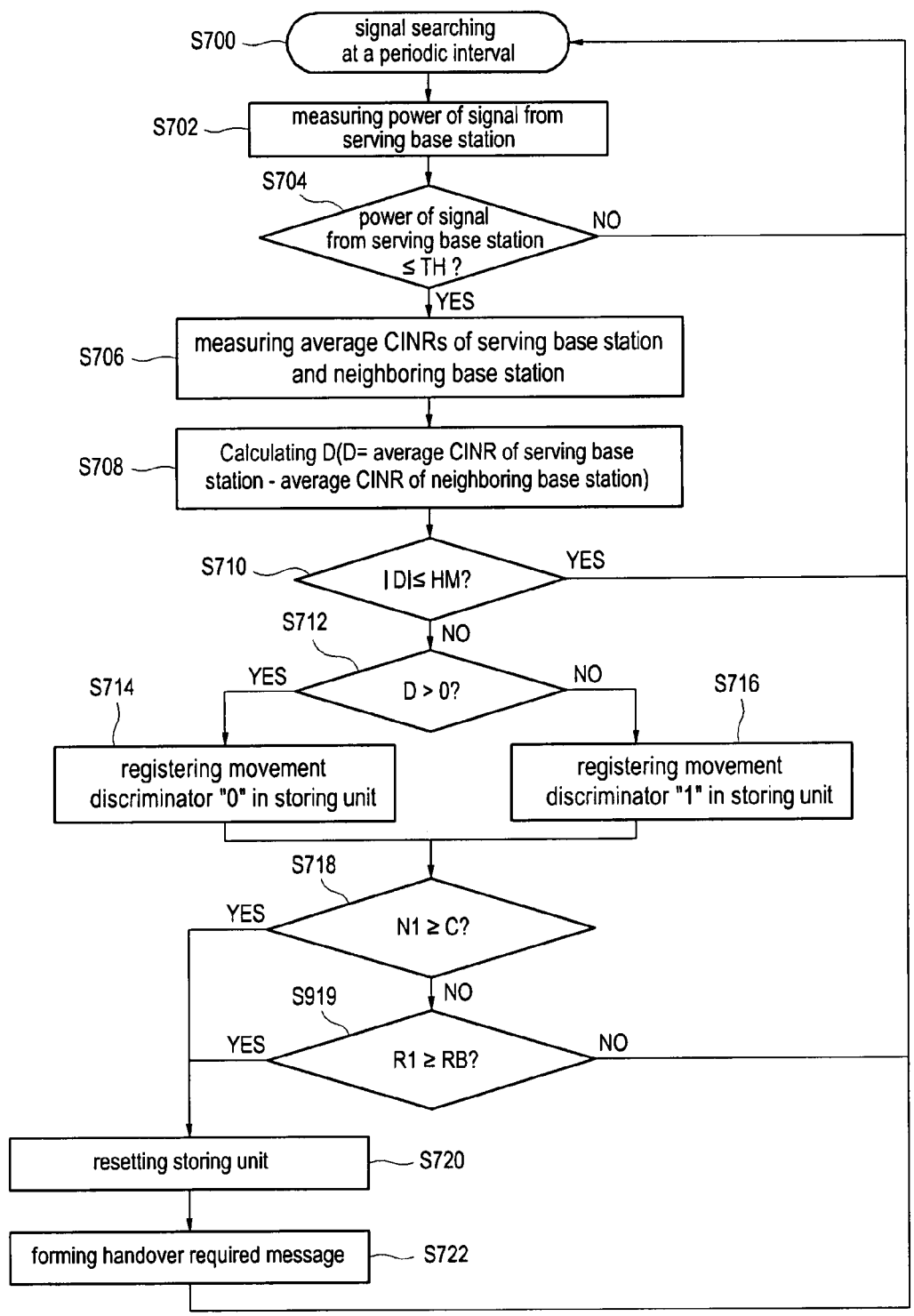

FIG. 9 is a flowchart showing a handover method according to an example embodiment of the present invention. Other embodiments, operations and orders of operation are also within the scope of the present invention. As shown in FIG. 9, after S714 or S716, the controlling unit 132 may decide whether or not to perform the handover by determining whether a number N1 is greater than the reference number C (S718). If the number N1 is below the reference number C, then the controlling unit 132 may determine whether the rate of R1 is greater than the predetermined rate RB (S919). If the rate R1 is below the predetermined rate RB, then the controlling unit 132 may return to S700 since the handover is not required. If the number N1 is greater than the reference number C or the rate R1 is greater than the predetermined rate RB, then the controlling unit 132 may perform S720 and S722 since the conditions required to perform the handover are satisfied.

Other embodiments may hereafter be described for performing the handover when a mobile station moves from one cell of the serving base station and other cells of a plurality of neighboring base stations.

Figure 10:
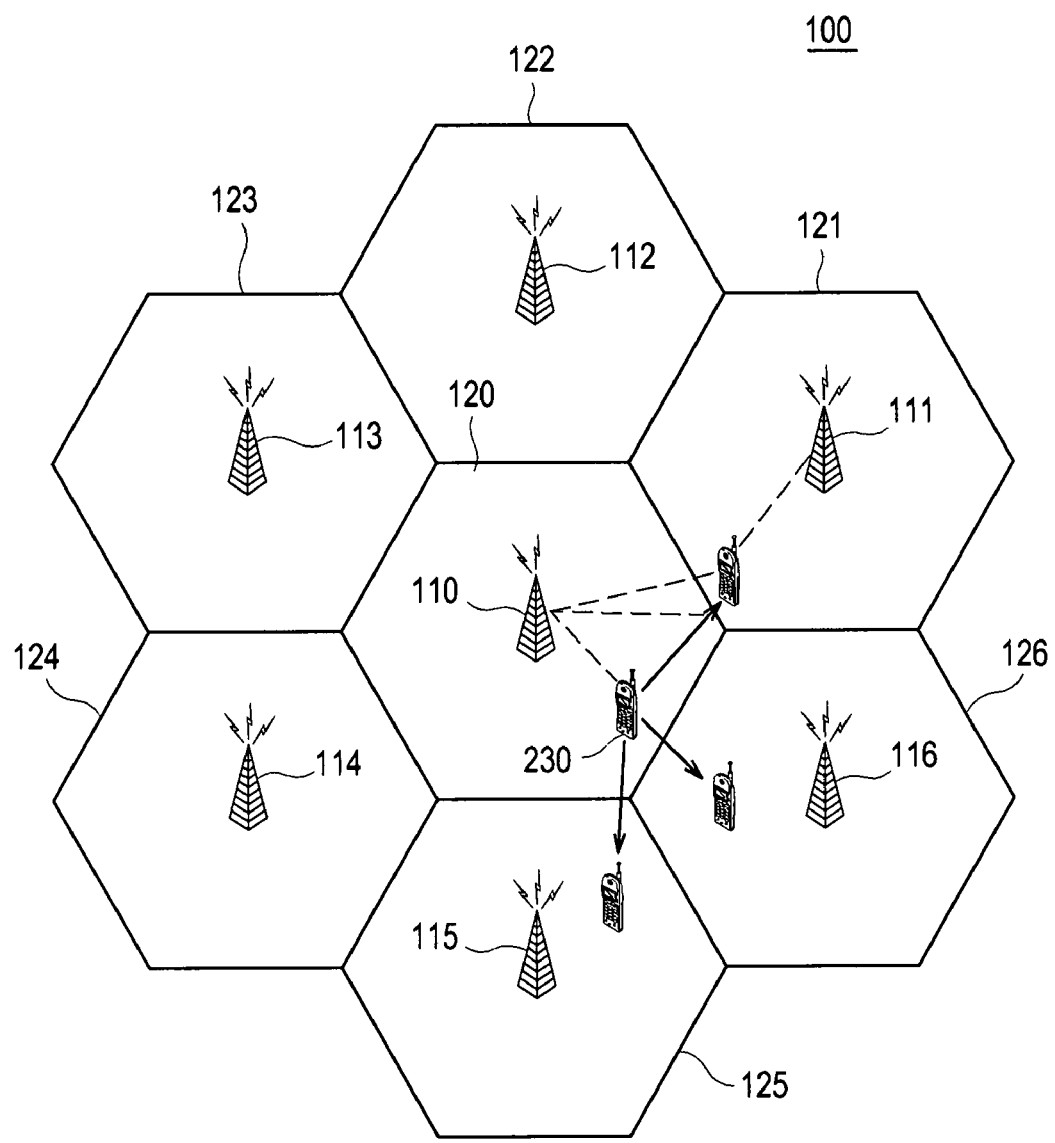
FIG. 10 is a schematic diagram of a mobile communication environment.

FIG. 10 is a schematic diagram of a mobile communication environment according to an example embodiment of the present invention. Other embodiments and configurations are also within the scope of the present invention. More specifically, FIG. 10 shows the mobile communication environment 100 wherein a mobile station 230 may move among the cells. As shown in FIG. 10, the mobile station 230 may move in and out of the cell 120 of the serving base station 110 and other cells 121, 125 and 126 of the neighboring base stations 111, 115 and 116. The base stations 110, 111, 115 . . . 116 may be discriminated with identifiers I0, I1, I5 . . . I6, respectively.

Figure 11:
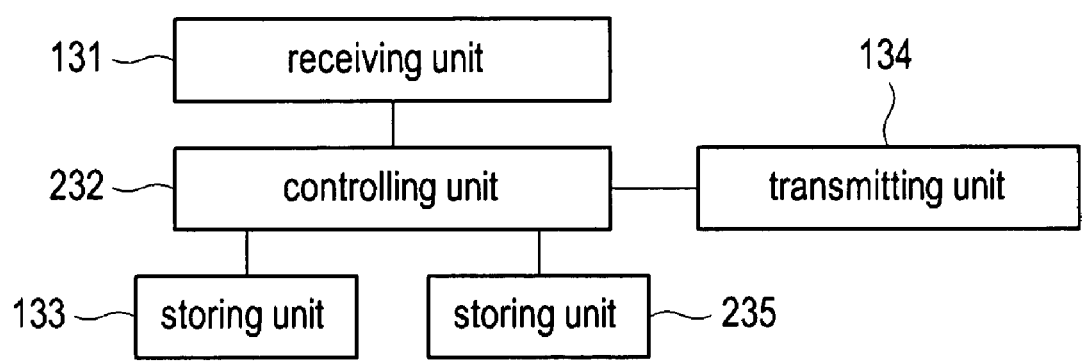
FIG. 11 shows a mobile station according to an example embodiment of the present invention.

FIG. 11 shows a mobile station according to an example embodiment of the present invention. Other embodiments and configurations are also within the scope of the present invention. More specifically, FIG. 11 shows a mobile station 230 that includes the receiving unit 131, the controlling unit 132, the storing unit 133, a storing unit 235 (for base station identifiers) and the transmitting unit 134. The mobile station 230 may perform functions of the mobile station 130 (as shown in FIG. 5). The mobile station 230 may also perform an additional function of handover from the serving base station 110 to a select neighboring station among the plurality of neighboring base stations 111, 115 and 116. The mobile station 230 may further include the storing unit 235 (of base station identifiers).

The controlling unit 132 may periodically measure the signals that are transmitted from the serving base station 110 and the neighboring base stations 111, 115 and 116 with the respective identifiers when the power of the signals transmitted from the base station 110 is below the critical power TH. The controlling unit 232 may form a movement discriminator of the mobile station 230 among the cells based on the measured power and register the movement discriminator accumulatively in the storing unit 133. The controlling unit 232 may also select one neighboring base station that has transmitted the maximum power, extract the identifier of the selected neighboring station from the signals transmitted from the selected neighboring base station, and register the identifier of the selected neighboring base station in the storing unit 235. Further, the controlling unit 232 may form a handover required message based on movement discriminators and the identifiers that are accumulatively stored in the storing units 133 and 235, respectively.

Figure 12:
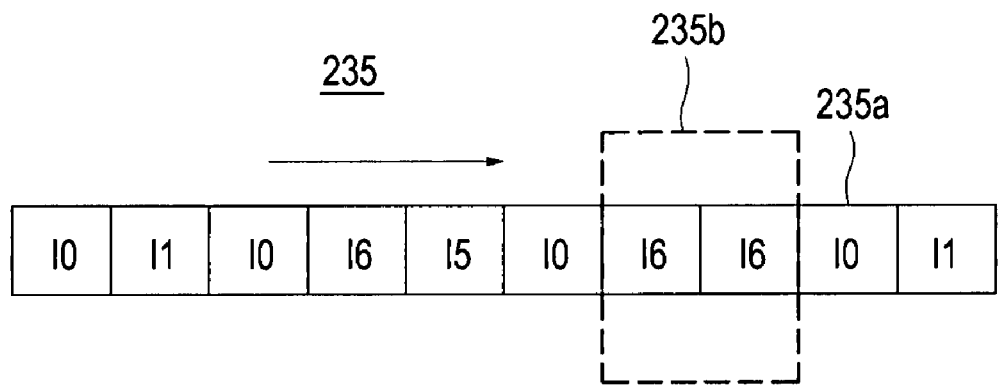
FIG. 12 illustrates registering identifiers of base stations.

FIG. 12 illustrates registering identifiers of base stations in the storing unit 235. The storing unit 235 may include a plurality of storing regions 235a. The storing unit 235 may be configured with a buffer memory or a register. In each of the storing regions 235a, identifiers of the selected neighboring base stations that have transmitted maximum power signals may be registered one after another according to the extracted order from the controlling unit 232. In FIG. 12, an arrow denotes a consecutive registering order of the identifiers. If all the storing regions 235a are filled with the identifiers, then the identifier registered first may be replaced with the identifier extracted last one after another.

Figure 13:
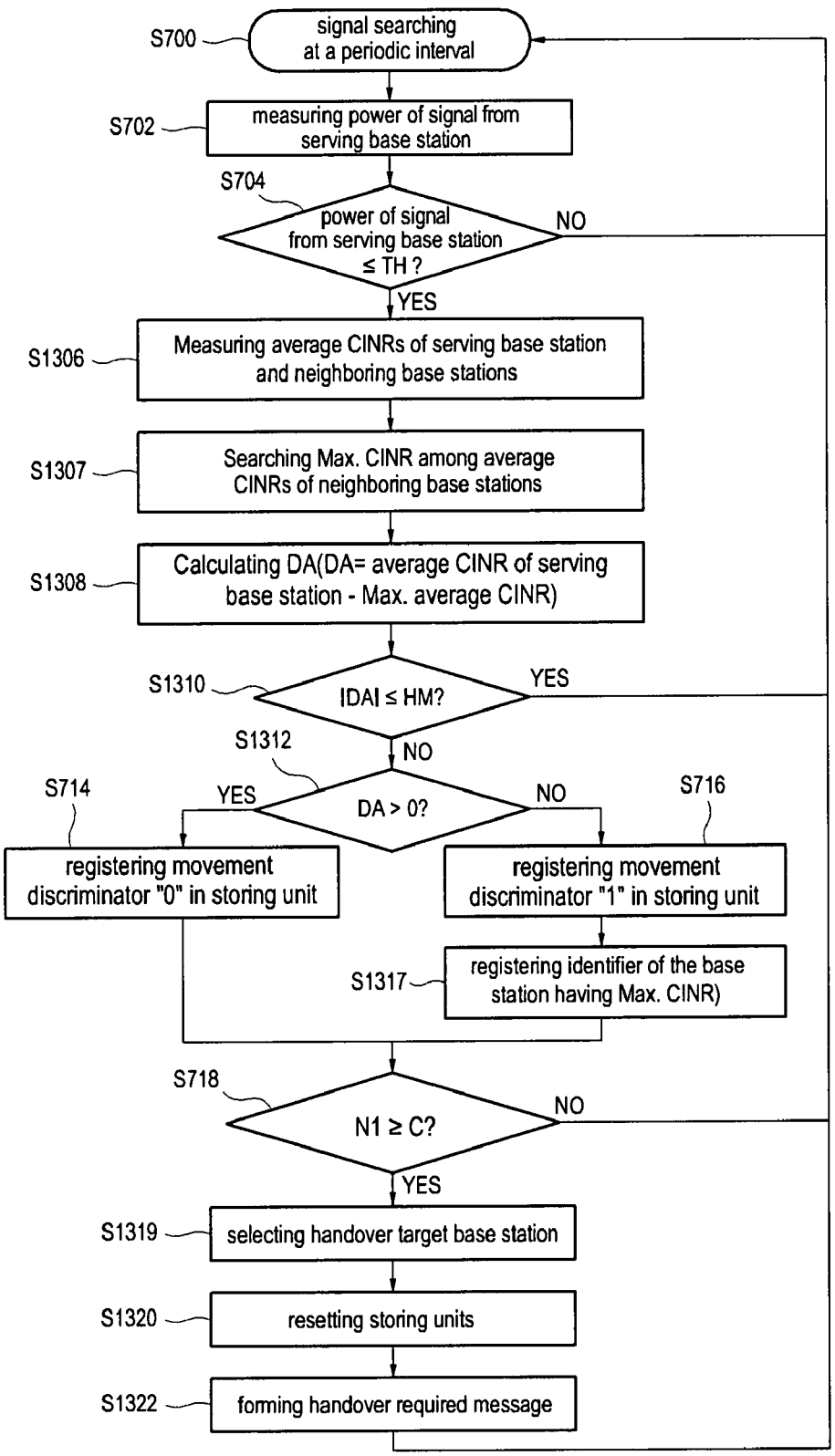

FIG. 13 is a flowchart of a handover method according to an example embodiment of the present invention. Other embodiments, operations and orders of operations may also be within the scope of the present invention. As shown in FIG. 13, the controlling unit 232 of the mobile station 230 may scan or search transmitted signals from the serving base station at a periodic interval (S700). The controlling unit 232 may scan the transmitted signals every 125 ms, for example. The controlling unit 232 may also measure the power of the transmitted signals from the serving base station (S702).

The controlling unit 232 may determine whether the measured power is greater than or less than the critical power TH (S704). If the power is greater than the critical power TH, then the controlling unit 232 may perform S700 to S702 once again since handover is not required. If the power is less than or equal to the critical power TH, then average CINRs of the serving base station 110 and the neighboring stations 111 to 116 may be measured over a predetermined time, such as 100 ms (S1306). The maximum average CINR may be determined by searching the measured average CINRs of the neighboring base stations 111 to 116 (S1307).

The maximum average CINR may be subtracted from the average CINR of the serving base station to obtain a difference DA (S1308). The controlling unit 232 may compare an absolute value of the difference DA with a hysteresis margin HM (S1310). If the difference DA is not greater than the hysteresis margin HM, then the controlling unit 232 may return to S700 since handover is not required. If the absolute value of the difference DA is greater than the hysteresis margin HM, then the controlling unit 232 may determine whether the difference DA is a positive number (S1312). If the difference DA is a positive number, then the controlling unit 232 may form a first movement discriminator "0" and register the first movement discriminator "0" in a vacant storing region 133a of the storing unit 133 in order (S714). If the difference DA is not a positive number, then the mobile station may stay within the cell of the neighboring base station that transmits the maximum power signal (hereinafter referred to as a selected base station). In such a case, the controlling unit 232 may form a second movement discriminator "1" and register the discriminator "1" in one of the storing regions 133a in order (S716). The controlling unit 232 may also extract the identifier of the selected neighboring base station and register the extracted identifier in one of the storing regions 235a in order (S1317).

After performing S714 or S1317, the controlling unit 232 may decide whether or not to perform handover based on the discriminators and the identifiers registered accumulatively in the storing units 133 and 235, respectively. A determination may be made whether the number N1 is greater than the reference number C (S718). If the number N1 is less than the reference number C, then the controlling unit 232 may return to S700 since handover is not required. If the number N1 is greater than the reference number C, then the controlling unit 232 may select a target base station among the neighboring stations 111 to 116 based on the identifiers registered in the storing unit 235 (S1319) since the mobile station 130 is in an active state to perform the handover.

The target base station may be based on any one of a plurality of methods. For example, a neighboring base station corresponding to an identifier that is the most consecutive identifier among the identifiers registered in the storing unit 235 may be selected as the target base station. Also, a neighboring base station corresponding to the identifier registered recently or to the identifier most frequently registered in the storing unit 235 may be selected as the target base station. In the active state, the controlling unit 232 may reset the storing units 133 and 235 to remove the movement discriminators and the identifiers (S1320), and form a handover required message including the identifier of the target base station (S1322). The handover required message may be sent to the serving base station through the transmitting unit 134 to perform the handover.

Figure 14:
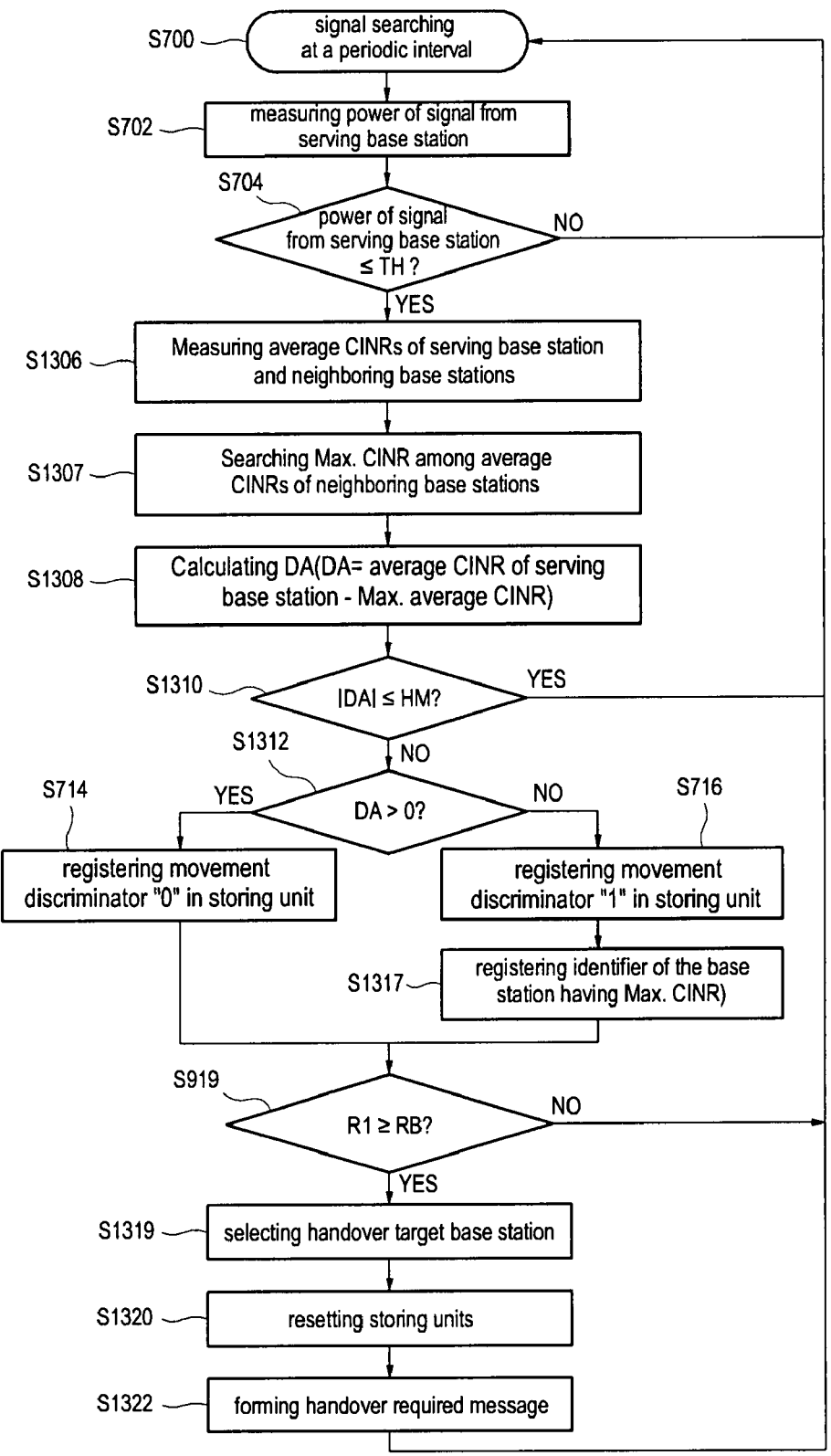

FIG. 14 is a flowchart showing a handover method according to an example embodiment of the present invention. Other embodiments, operations and orders of operations may also be within the scope of the present invention. More specifically, as shown in FIG. 14, after S714 or S1317, the controlling unit 232 may decide whether or not to perform handover by determining whether the rate R1 is greater than the predetermined rate RB (S919). If the rate R1 is greater than the predetermined rate RB, then the controlling unit 232 may perform S1319, S1320 and S1322. If the rate R1 is less than the predetermined rate RB, then the controlling unit 232 may return to S700.

FIG. 15 is a flowchart showing a handover method according to an example embodiment of the present invention. Other embodiments, operations and orders of operation may also be within the scope of the present invention. As shown in FIG. 15, at S718, if the number N1 is below the reference number C, then the controlling unit 232 may determine whether the rate R1 is greater than the predetermined rate RB (S919). If the rate R1 is greater than the predetermined rate RB, then the controlling unit 232 may perform S1320, S1322 and S1324 since conditions required to perform the handover are satisfied. If the rate R1 is less than the predetermined rate RB, then the controlling unit 232 may return to S700 since handover is not required.

In the above-described embodiments, an average CINR may be used to compare power of signals transmitted from the base stations. However, other information on the power of the signals may also be used. For example, a Received Signal Strength Indication (RSSI) may be used rather than CINR. Also, an instant power of signals may be compared to one another rather than the average power. Furthermore, in the above-described embodiments, an order of performance may be changed. For instance, S722 (S1322) may be performed prior to S720 (S1320).

A determination may be made whether or not to perform handover based on a plurality of results for determining a location of the mobile station rather than determining the location of the mobile station only once. Therefore, performance of the handover may be determined only when the mobile station is highly likely to move from the cell of the serving base station to another cell of the neighboring cell. Accordingly, excessive handovers may be prevented from occurring even though the mobile station frequently goes in and out of the border between cells.

Embodiments of the present invention may provide a method of performing a handover between one cell of a serving base station and at least one cell of a neighboring base station of a mobile station. This may include scanning signals transmitted from the serving base station and the neighboring base station at a periodic interval, measuring a power of the transmitted signals, forming a movement discriminator based on the power of the transmitted signals, wherein the movement discriminator denotes the mobile station in the cell of the serving base station. The method may also include registering accumulatively the movement discriminator, determining whether or not to perform the handover based on the discriminators registered accumulatively, repeating the scanning, the measuring, the forming, the registering and the determining when the handover is determined not to be performed.

Embodiments of the present invention may also include scanning signals transmitted from a serving base station and a neighboring base station at a periodic interval, measuring a power of the transmitted signals, and comparing the power of the transmitted signal from the serving base station to a critical power. The method may also include forming a movement discriminator based on the power of the transmitted signals when the signal power of the serving base station is below the critical power, registering accumulatively the movement discriminator, determining whether to perform the handover based on the discriminators registered accumulatively, and repeating the scanning, the measuring, the comparing, the forming, the registering and the determining when the handover is determined not to be performed.

Embodiments of the present invention may provide a method of performing a handover among a first cell of a serving base station and second cells of a plurality of neighboring base stations of a mobile station. The method may include scanning signals transmitted from the serving base station and the neighboring stations at a periodic interval, wherein the transmitted signals include identifiers of the serving base station and the neighboring base stations. The method may also include measuring a power of the transmitted signals, comparing the power of the transmitted signal from the serving base station with a critical power, and forming a movement discriminator based on the power of the signals when the signal power of the serving base station is less than the critical power. The method may also include registering accumulatively the movement discriminator, selecting the neighboring base station having transmitted the maximum power signal, extracting the identifier of the selected neighboring base station from the transmitted signal of the selected neighboring base station and registering accumulatively the extracted identifier. Still further, the method may also include determining whether to perform the handover based on the discriminators stored accumulatively, selecting a target base station based on the identifiers stored accumulatively, and repeating the scanning, the measuring, the forming, the registering the selecting, the extracting and the determining when the handover is determined not to be performed.

A mobile station moving between a cell of a serving base station and at least one cell of neighboring base stations may be provided. The mobile station may include a receiving unit configured to receive signals transmitted from the serving base station and the neighboring stations and a controlling unit. The controlling unit may be configured to measure a power of the transmitted signals, compare the power of the transmitted signal from the serving base station to a critical power, form a movement discriminator based on the power of the transmitted signals when the signal power of the serving base station is less than the critical power and register the movement discriminator accumulatively. The controlling unit may be further configured to determine whether or not to perform the handover based on the discriminators registered accumulatively, and form a handover required message when the handover is determined to be performed. A first storing unit may also be provided to store the movement discriminator accumulatively.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of performing a handover between one cell of a serving base station and another cell of a neighboring base station of a mobile station, comprising:
    scanning signals transmitted from the serving base station and the neighboring base station at a periodic interval;
    measuring a power of the transmitted signals from the serving base station and the neighboring base station;
    comparing the measured power of the transmitted signal from the serving base station to a critical power;
    forming a movement discriminator based on the measured power of the transmitted signals when the comparing determines that the measured power of the transmitted signal from the serving base station is below the critical power;
    accumulatively registering the movement discriminator;
    determining whether to perform the handover or whether not to perform the handover based on a plurality of the registered movement discriminators, wherein the plurality of the movement discriminators includes a first movement discriminator denoting that the mobile station stays in the cell of the serving base station and a second movement discriminator denoting that the mobile station stays in the cell of the neighboring base station, wherein the determining includes determining to perform the handover when a total number of the second movement discriminators consecutively registered is greater than a reference number; and
    repeating the scanning, the measuring, the comparing, the forming, the registering and the determining when the handover is determined not to be performed based on the registered movement discriminators.

2. The method of claim 1, wherein the measuring the power includes:
    measuring a first power of a signal transmitted from the serving base station and a second power of another signal transmitted from the neighboring base station,
    wherein the comparing includes:
        subtracting the second power from the first power and obtaining a subtracting result; and
        comparing the subtracting result with a predetermined margin, and
    wherein the forming includes:
        forming the first movement discriminator when the subtracting result is greater than a predetermined margin and the subtracting result is a positive number; and
        forming the second movement discriminator when the subtracting result is greater than the predetermined margin and the subtracting result is not a positive number.

3. A method of performing a handover between one cell of a serving base station and another cell of a neighboring base station of a mobile station, comprising:
    scanning signals transmitted from the serving base station and the neighboring base station at a periodic interval;
    measuring a power of the transmitted signals from the serving base station and the neighboring base station;
    comparing the measured power of the transmitted signal from the serving base station to a critical power;
    forming a movement discriminator based on the measured power of the transmitted signals when the comparing determines that the measured power of the transmitted signal from the serving base station is below the critical power;
    accumulatively registering the movement discriminator;
    determining whether to perform the handover or whether not to perform the handover based on a plurality of the registered movement discriminators, wherein the plurality of movement discriminators includes a first movement discriminator denoting that the mobile station stays in the cell of the serving base station and a second movement discriminator denoting that the mobile station stays in the cell of the neighboring base station, wherein the determining includes determining to perform the handover when a total number of the registered second discriminators over a total number of the registered first discriminators and the registered second discriminators is greater than a predetermined rate; and
    repeating the scanning, the measuring, the comparing, the forming, the registering and the determining when the handover is determined not to be performed based on the registered movement discriminators.

4. The method of claim 3, wherein the measuring the power includes:
    measuring a first power of a signal transmitted from the serving base station and a second power of another signal transmitted from the neighboring base station,
    wherein the comparing includes:
        subtracting the second power from the first power and obtaining a subtracting result; and
        comparing the subtracting result with a predetermined margin, and
    wherein the forming includes:
        forming the first movement discriminator when the subtracting result is greater than a predetermined margin and the subtracting result is a positive number; and forming the second movement discriminator when the subtracting result is greater than the predetermined margin and the subtracting result is not a positive number.

5. A method of performing a handover between one cell of a serving base station and another cell of a neighboring base station of a mobile station, comprising:
scanning signals transmitted from the serving base station and the neighboring base station at a periodic interval;
measuring a power of the transmitted signals from the serving base station and the neighboring base station;
comparing the measured power of the transmitted signal from the serving base station to a critical power;
forming a movement discriminator based on the measured power of the transmitted signals when the comparing determines that the measured power of the transmitted signal from the serving base station is below the critical power;
accumulatively registering the movement discriminator;
determining whether to perform the handover or determining whether not to perform the handover based on a plurality of the registered movement discriminators, wherein the plurality of movement discriminators includes a first movement discriminator denoting that the mobile station stays in the cell of the serving base station and a second movement discriminator denoting that the mobile station stays in the cell of the neighboring base station, and wherein the determining includes determining to perform the handover when a total number of the second movement discriminators consecutively registered is greater than a reference number and the total number of the registered second discriminators over a total number of registered first discriminators and registered second discriminators is greater than a predetermined rate; and
repeating the scanning, the measuring, the comparing, the forming, the registering and the determining when the handover is determined not to be performed based on the registered movement discriminators.

6. The method of claim 5, wherein the measuring the power includes:
measuring a first power of a signal transmitted from the serving base station and a second power of another signal transmitted from the neighboring base station,
wherein the comparing includes:
subtracting the second power from the first power and obtaining a subtracting result; and
comparing the subtracting result with a predetermined margin, and
wherein the forming includes:
forming the first movement discriminator when the subtracting result is greater than a predetermined margin and the subtracting result is a positive number; and
forming the second movement discriminator when the subtracting result is greater than the predetermined margin and the subtracting result is not a positive number.

7. A method of performing a handover among a first cell of a serving base station and second cells of a plurality of neighboring base stations of a mobile station, comprising:
scanning signals transmitted from the serving base station and the neighboring stations at a periodic interval, wherein the transmitted signals include identifiers of the serving base station and the neighboring base stations;
measuring a power of the transmitted signals from the serving base station and the neighboring stations;
comparing the measured power of the transmitted signal from the serving base station to a critical power;
forming a movement discriminator based on the measured power of the signals when the comparing determines that the signal power of the serving base station is less than the critical power;
accumulatively registering the movement discriminator;
selecting the neighboring base station having transmitted a maximum power signal;
extracting an identifier of the selected neighboring base station from the transmitted signal of the selected neighboring base station and accumulatively registering the extracted identifier;
determining whether or not to perform the handover based on a plurality of the discriminators stored accumulatively and selecting a target base station based on the identifiers stored accumulatively, wherein the plurality of the movement discriminators includes a first movement discriminator denoting that the mobile station stays in the first cell of the serving base station and a second movement discriminator denoting that the mobile station stays in at least one of the second cells of the neighboring base stations, and wherein the determining includes determining to perform the handover when a total number of the second movement discriminators consecutively registered is greater than a reference number; and
repeating the scanning, the measuring, the comparing, the forming, the registering, the selecting, the extracting and the determining when the handover is determined not to be performed.

8. The method of claim 7, wherein the measuring the power includes:
measuring a first power of the transmitted signal from the serving base station and a plurality of second power of the other signals transmitted from the neighboring base stations, and
the forming includes:
searching the maximum power signal from among the second power of the signals;
subtracting the maximum power from the first power and obtaining a subtracting result;
comparing the subtracting result with a predetermined margin;
forming the first movement discriminator when the subtracting result is greater than the predetermined margin and the subtracting result is a positive number; and
forming the second movement discriminator when the subtracting result is greater than the predetermined margin and the subtracting result is not the positive number.

9. A method of performing a handover among a first cell of a serving base station and second cells of a plurality of neighboring base stations of a mobile station, comprising:
scanning signals transmitted from the serving base station and the neighboring stations at a periodic interval, wherein the transmitted signals include identifiers of the serving base station and the neighboring base stations;
measuring a power of the transmitted signals from the serving base station and the neighboring stations;
comparing the measured power of the transmitted signal from the serving base station to a critical power;
forming a movement discriminator based on the measured power of the signals when the comparing determines that the signal power of the serving base station is less than the critical power;
accumulatively registering the movement discriminator;

selecting the neighboring base station having transmitted a maximum power signal;
extracting an identifier of the selected neighboring base station from the transmitted signal of the selected neighboring base station and accumulatively registering the extracted identifier;
determining whether or not to perform the handover based on a plurality of the discriminators stored accumulatively and selecting a target base station based on the identifiers stored accumulatively, wherein the plurality of movement discriminators includes a first movement discriminator denoting that the mobile station stays in the first cell of the serving base station and a second movement discriminator denoting that the mobile station stays in at least one of the second cells of the neighboring base stations, and wherein the determining includes determining to perform the handover when a total number of the registered second discriminators over a total number of the registered first discriminators and the registered second discriminators is greater than a predetermined rate; and
repeating the scanning, the measuring, the comparing, the forming, the registering, the selecting, the extracting and the determining when the handover is determined not to be performed.

10. The method of claim 9, wherein the measuring the power includes:
measuring a first power of the transmitted signal from the serving base station and a plurality of second power of the other signals transmitted from the neighboring base stations, and
the forming includes:
searching the maximum power signal from among the second power of the signals;
subtracting the maximum power from the first power and obtaining a subtracting result;
comparing the subtracting result with a predetermined margin;
forming the first movement discriminator when the subtracting result is greater than the predetermined margin and the subtracting result is a positive number; and
forming the second movement discriminator when the subtracting result is greater than the predetermined margin and the subtracting result is not the positive number.

11. A method of performing a handover among a first cell of a serving base station and second cells of a plurality of neighboring base stations of a mobile station, comprising:
scanning signals transmitted from the serving base station and the neighboring stations at a periodic interval, wherein the transmitted signals include identifiers of the serving base station and the neighboring base stations;
measuring a power of the transmitted signals from the serving base station and the neighboring stations;
comparing the measured power of the transmitted signal from the serving base station to a critical power;
forming a movement discriminator based on the measured power of the signals when the comparing determines that the signal power of the serving base station is less than the critical power;
accumulatively registering the movement discriminator;
selecting the neighboring base station having transmitted a maximum power signal;
extracting an identifier of the selected neighboring base station from the transmitted signal of the selected neighboring base station and accumulatively registering the extracted identifier;
determining whether or not to perform the handover based on a plurality of the discriminators stored accumulatively and selecting a target base station based on the identifiers stored accumulatively, wherein the plurality of the movement discriminators includes a first movement discriminator denoting that the mobile station stays in the first cell of the serving base station and a second movement discriminator denoting that the mobile station stays in at least one of the second cells of the neighboring base stations, and wherein the determining includes determining to perform the handover when a total number of the second movement discriminators consecutively registered is greater than a reference number and the total number of the registered second discriminators over a total number of the registered first discriminators and the registered second discriminators is greater than a predetermined rate; and
repeating the scanning, the measuring, the comparing, the forming, the registering, the selecting, the extracting and the determining when the handover is determined not to be performed.

12. The method of claim 11, wherein the measuring the power includes:
measuring a first power of the transmitted signal from the serving base station and a plurality of second power of the other signals transmitted from the neighboring base stations, and
the forming includes:
searching the maximum power signal from among the second power of the signals;
subtracting the maximum power from the first power and obtaining a subtracting result;
comparing the subtracting result with a predetermined margin;
forming the first movement discriminator when the subtracting result is greater than the predetermined margin and the subtracting result is a positive number; and
forming the second movement discriminator when the subtracting result is greater than the predetermined margin and the subtracting result is not the positive number.

13. A mobile station comprising:
a receiving unit to receive signals transmitted from a serving base station and neighboring base stations;
a first storing unit; and
a controlling unit configured to:
measure a power of the transmitted signals;
compare the power of the transmitted signal from the serving base station to a critical power,
form a movement discriminator based on the power of the transmitted signals when the signal power of the serving base station is compared to be less than the critical power,
register the movement discriminator accumulatively,
determine whether to perform the handover or whether not to perform the handover based on a plurality of the discriminators registered accumulatively, wherein the controlling unit is configured to form a first movement discriminator denoting that the mobile station stays in a cell of the serving base station and to form a second movement discriminator denoting that the mobile station stays in a cell of the neighboring base station, wherein the controlling unit determines to perform the handover when a total number of the second movement discriminators consecutively registered in the first storing unit is greater than a reference number;

form a handover required message when the handover is determined to be performed, wherein the first storing unit is configured to store the movement discriminator accumulatively.

14. The mobile station of claim 13, wherein the controlling unit is further configured to:
measure a first power of a signal transmitted from the serving base station and a second power of another signal transmitted from the neighboring base stations;
subtract the second power from the first power and obtain a subtracting result;
compare the subtracting result to a predetermined margin;
form the first movement discriminator when the subtracting result is greater than the predetermined margin and the subtracting result is a positive number; and
form the second movement discriminator when the subtracting result is greater than the predetermined margin and the subtracting result is not the positive number.

15. The mobile station of claim 13, further comprising a second storing unit to store identifiers accumulatively, and wherein the transmitted signals include identifiers of the serving base station and the neighboring base stations, and the controlling unit is further configured to:
select a neighboring base station having transmitted a maximum power signal;
extract an identifier of the selected base station from the signal transmitted from the selected neighboring base station;
register the extracted identifier accumulatively; and
select a target base station based on the identifiers accumulatively registered in the second storing unit.

16. A mobile station comprising:
a receiving unit to receive signals transmitted from a serving base station and neighboring base stations;
a first storing unit; and
a controlling unit configured to:
measure a power of the transmitted signals;
compare the power of the transmitted signal from the serving base station to a critical power,
form a movement discriminator based on the power of the transmitted signals when the signal power of the serving base station is compared to be less than the critical power,
register the movement discriminator accumulatively,
determine whether to perform the handover or whether not to perform the handover based on a plurality of the discriminators registered accumulatively, wherein the controlling unit is configured to form a first movement discriminator denoting that the mobile station stays in a cell of the serving base station and to form a second movement discriminator denoting that the mobile station stays in a cell of the neighboring base station, wherein the controlling unit determines to perform the handover when a total number of the registered second discriminators over a total number of the registered first discriminators and the registered second discriminators is greater than a predetermined rate;
form a handover required message when the handover is determined to be performed, wherein the first storing unit is configured to store the movement discriminator accumulatively.

17. The mobile station of claim 16, wherein the controlling unit is further configured to:
measure a first power of a signal transmitted from the serving base station and a second power of another signal transmitted from the neighboring base stations;
subtract the second power from the first power and obtain a subtracting result;
compare the subtracting result to a predetermined margin;
form the first movement discriminator when the subtracting result is greater than the predetermined margin and the subtracting result is a positive number; and
form the second movement discriminator when the subtracting result is greater than the predetermined margin and the subtracting result is not the positive number.

18. A mobile station comprising:
a receiving unit to receive signals transmitted from a serving base station and neighboring base stations;
a first storing unit; and
a controlling unit configured to:
measure a power of the transmitted signals;
compare the power of the transmitted signal from the serving base station to a critical power,
form a movement discriminator based on the power of the transmitted signals when the signal power of the serving base station is compared to be less than the critical power,
register the movement discriminator accumulatively,
determine whether to perforin the handover or whether not to perform the handover based on a plurality of the discriminators registered accumulatively, wherein the controlling unit is configured to form a first movement discriminator denoting that the mobile station stays in a cell of the serving base station and to form a second movement discriminator denoting that the mobile station stays in a cell of the neighboring base station, wherein the controlling unit determines to perform the handover when a total number of the second movement discriminators consecutively registered in the first storing unit is greater than a reference number and a total number of the registered second discriminators over a total number of the registered first discriminators and the registered second discriminators is greater than a predetermined rate;
form a handover required message when the handover is determined to be performed, wherein the first storing unit is configured to store the movement discriminator accumulatively.

19. The mobile station of claim 18, wherein the controlling unit is further configured to:
measure a first power of a signal transmitted from the serving base station and a second power of another signal transmitted from the neighboring base stations;
subtract the second power from the first power and obtain a subtracting result;
compare the subtracting result to a predetermined margin;
form the first movement discriminator when the subtracting result is greater than the predetermined margin and the subtracting result is a positive number; and
form the second movement discriminator when the subtracting result is greater than the predetermined margin and the subtracting result is not the positive number.

\* \* \* \* \*